United States Patent
Yuyama et al.

(10) Patent No.: US 11,526,901 B2
(45) Date of Patent: Dec. 13, 2022

(54) REWARD POINT MANAGEMENT DEVICE, REWARD POINT MANAGEMENT METHOD, AND REWARD POINT MANAGEMENT SYSTEM

(71) Applicant: TOYOTA JIDOSHA KABUSHIKI KAISHA, Toyota (JP)

(72) Inventors: Hironobu Yuyama, Nagakute (JP); Yasuyuki Nunokawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 16/600,697

(22) Filed: Oct. 14, 2019

(65) Prior Publication Data
US 2020/0184500 A1    Jun. 11, 2020

(30) Foreign Application Priority Data
Dec. 11, 2018 (JP) .............................. JP2018-231825

(51) Int. Cl.
| | |
|---|---|
| G06Q 30/00 | (2012.01) |
| G06Q 30/02 | (2012.01) |
| B60W 40/09 | (2012.01) |
| G06Q 30/06 | (2012.01) |

(52) U.S. Cl.
CPC ......... *G06Q 30/0207* (2013.01); *B60W 40/09* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 10,013,697 | B1 * | 7/2018 | Cote ..................... | B60W 40/09 |
| 10,445,758 | B1 * | 10/2019 | Bryer ..................... | G06Q 40/08 |
| 10,915,964 | B1 * | 2/2021 | Purgatorio ......... | G06Q 30/0226 |

(Continued)

FOREIGN PATENT DOCUMENTS

| | | |
|---|---|---|
| JP | 2002-230696 A | 8/2002 |
| JP | 2015-130138 A | 7/2015 |
| JP | 2017-116995 A | 6/2017 |

OTHER PUBLICATIONS

Dijksterhuis, Chris, et al. "The Impact of Immediate or Delayed Feedback on Driving Behaviour in a Simulated Pay-As-You-Drive System." Accident Analysis and Prevention., 75, pp. 93-104. (Year: 2015).*

(Continued)

*Primary Examiner* — Luis A Brown
(74) *Attorney, Agent, or Firm* — Oblon, McClelland, Maier & Neustadt, L.L.P.

(57) ABSTRACT

A reward point management device includes one or more processors configured to: calculate a safe driving score based on safe driving points corresponding to a degree of safe driving of a user according to a user's driving behavior in a leased vehicle; calculate an eco-driving score based on eco-driving points corresponding to a degree of eco-driving of the user according to the user's driving behavior in the leased vehicle; calculate a service score based on service entry information on the leased vehicle; and calculate reward points to be given to the user based on the safe driving score, the eco-driving score, and the service score.

12 Claims, 3 Drawing Sheets

(56) References Cited

U.S. PATENT DOCUMENTS

| | | | | |
|---|---|---|---|---|
| 2009/0144149 A1* | 6/2009 | Sakakibara | G06Q 10/10 | 705/14.62 |
| 2009/0186689 A1* | 7/2009 | Hughes | G06Q 30/0216 | 705/14.18 |
| 2009/0222338 A1* | 9/2009 | Hamilton, II | G06Q 30/02 | 705/14.1 |
| 2010/0280885 A1* | 11/2010 | Eckhoff | B60K 6/48 | 705/14.1 |
| 2010/0280886 A1* | 11/2010 | Eckhoff | B60K 6/44 | 705/14.1 |
| 2010/0280887 A1* | 11/2010 | Eckhoff | G06Q 30/02 | 705/14.1 |
| 2011/0106591 A1* | 5/2011 | Eckhoff | G06Q 30/0207 | 705/14.1 |
| 2013/0090821 A1* | 4/2013 | Abboud | G07C 5/085 | 701/123 |
| 2013/0218427 A1* | 8/2013 | Mukhopadhyay | G06F 17/00 | 701/99 |
| 2014/0113619 A1* | 4/2014 | Tibbitts | G01C 21/3697 | 455/419 |
| 2014/0266660 A1* | 9/2014 | Slaton | G07C 5/0825 | 340/439 |
| 2014/0358356 A1* | 12/2014 | Jones | G07C 5/008 | 701/32.7 |
| 2015/0081404 A1* | 3/2015 | Basir | G06Q 30/08 | 705/14.1 |
| 2015/0310467 A1* | 10/2015 | Klampfl | G08G 1/005 | 705/7.35 |
| 2017/0193819 A1* | 7/2017 | Vandikas | G08G 1/123 | |
| 2017/0311132 A1* | 10/2017 | Drayson | H04W 4/42 | |
| 2019/0019122 A1* | 1/2019 | Allen | G06Q 50/30 | |
| 2019/0019133 A1* | 1/2019 | Allen | G06Q 40/08 | |
| 2019/0066249 A1* | 2/2019 | Decaluwe | G06Q 30/0282 | |
| 2020/0090207 A1* | 3/2020 | Reichenbach | H04L 67/303 | |
| 2020/0184500 A1* | 6/2020 | Yuyama | B60W 40/09 | |

OTHER PUBLICATIONS

Loumidi, Anna Korina, et al. "Eco-Driving Incentives in the North American Market." Automotive UI, Salzburg, Austria, Dec. 2011. (Year: 2011).*

Corcoba, Magana, et al. "The Impact of Using Gamification on the Eco-Driving Learning." Ambient Intelligence Software and Applications: Advances in Intelligent Systems and Computing, vol. 291, pp. 45-52, 2014. (Year: 2014).*

Dogan Ebru, et al. "Making Small Numbers Count: Environmental and Financial Feedback in Promoting Eco-Driving Behaviors." Journal of Consumer Policy, vol. 37, pp. 413-422, Mar. 2014. (Year: 2014).*

Rapp, Carl. "Gamification as a Tool to Encourage Eco-Driving." Blekinge Institute of Technology, Karlskrina, Sweden, 2015. (Year: 2016).*

"Toyota to Start New Service Promoting New User-Car Relationship in Japan Beloved car subscription service1 called "KINTO2" to be deployed", Toyota Motor Corporation, Nov. 1, 2018, 4 pages (with English Translation).

* cited by examiner

| | | SAFETY DRIVING POINTS | | | | | |
|---|---|---|---|---|---|---|---|
| | | 100 | 99 - 90 | 89 - 80 | 79 - 70 | 69 - 60 | 59 - |
| TRAVEL DISTANCE | SHORT DISTANCE | 5 | 3 | 2 | 1 | 1 | 0 |
| | MIDDLE DISTANCE | 7 | 5 | 3 | 2 | | |
| | LONG DISTANCE | 10 | 7 | 5 | 3 | | |

| ECO-DRIVING POINTS | 100 | 99 - 90 | 89 - 80 | 79 - 70 | 69 - 60 | 59 - |
|---|---|---|---|---|---|---|
| ECO-DRIVING SCORE | 10 | 8 | 6 | 4 | 2 | 0 |

| SAFETY DRIVING POINTS | 100 | 99 - 90 | 89 - 80 | 79 - 70 | 69 - 60 | 59 - |
|---|---|---|---|---|---|---|
| SAFETY DRIVING SCORE | 5 | 4 | 3 | 2 | 1 | 0 |

REWARD POINT MANAGEMENT DEVICE, REWARD POINT MANAGEMENT METHOD, AND REWARD POINT MANAGEMENT SYSTEM

INCORPORATION BY REFERENCE

The disclosure of Japanese Patent Application No. 2018-231825 filed on Dec. 11, 2018 including the specification, drawings and abstract is incorporated herein by reference in its entirety.

BACKGROUND

1. Technical Field

The present disclosure relates to a reward point management device, a reward point management method, and a reward point management system.

2. Description of Related Art

A vehicle travel information management system for encouraging a driver of a vehicle to drive safely is known as a related art (see, for example, Japanese Unexamined Patent Application Publication No. 2002-230696 (JP 2002-230696 A)).

The vehicle travel information management system of the related art includes an information terminal device mounted on the vehicle and a server that communicates with the information terminal device. The information terminal device is configured to send vehicle travel information regarding a travel history of the vehicle to the server. The vehicle travel information contains control information such as vehicle speed, starting, braking, acceleration/deceleration, and steering. The server is configured to determine the status of travel of the vehicle by using the vehicle travel information received from the information terminal device and give reward and punishment points according to the determined result. The reward and punishment points are usable to, for example, pay for various fees. With this configuration, safe driving can be motivated.

SUMMARY

For lease services to leased vehicles to users, it is desired to minimize a decrease in the residual values of leased vehicles (values at the time of return). For this reason, to minimize a decrease in the residual values of leased vehicles, reducing the occurrence of accidents by encouraging safe driving is considered to be effective; however, there is room for further improvement.

The disclosure provides a reward point management device that is able to suppress a decrease in the residual value of a leased vehicle.

A reward point management device according to a first aspect of the disclosure includes one or more processors configured to: calculate a safe driving score based on safe driving points corresponding to a degree of safe driving of the user according to a user's driving behavior in a leased vehicle, the user leasing the leased vehicle; calculate an eco-driving score based on eco-driving points corresponding to a degree of eco-driving of the user according to the user's driving behavior on the leased vehicle; calculate a service score based on service entry information on the leased vehicle; and calculate reward points to be given to the user based on the safe driving score, the eco-driving score, and the service score.

A reward point management method according to a second aspect of the disclosure includes: transmitting driving behavior information to a server from a vehicle, the driving behavior information being information on a driving behavior of a user in the vehicle, and the vehicle being leased by the user; calculating, by using one or more processors of the server, safe driving points and eco-driving points based on the driving behavior information, the safe driving points indicating a degree of safe driving of the user, and the eco-driving points indicating a degree of eco-driving of the user; calculate, by using the one or more processors, a safe driving score based on the safe driving points; calculating, by using the one or more processors, an eco-driving score based on the eco-driving points; storing, in one or more memories, service entry information on service entry of the vehicle to a dealer; communicating the service entry information to the server from the one or more memories; calculating, by using the one or more processors, a service score based on the service entry information; calculating, by using the one or more processors, reward points to be given to the user who has driven the vehicle based on the safe driving score, the eco-driving score, and the service score; and outputting the reward points from the server to an output interface available to the user.

A reward point management system according to a third aspect of the disclosure includes: a vehicle leased by a user; one or more first memories storing service entry information on service entry of the vehicle to a dealer; and a server including one or more communication modules configured to communicate with the vehicle and the one or more first memories, one or more processors, and one or more second memories storing instructions that cause the one or more processors to acquire, from the vehicle, driving behavior information on a driving behavior of the user in the vehicle, calculate safe driving points and eco-driving points based on the driving behavior information, the safe driving points indicating a degree of safe driving of the user, and the eco-driving points indicating a degree of eco-driving of the user, calculate a safe driving score based on the safe driving points, calculate an eco-driving score based on the eco-driving points, acquire the service entry information from the one or more first memories, calculate a service score based on the service entry information, calculate reward points to be given to the user who has driven the vehicle based on the safe driving score, the eco-driving score, and the service score, and output the reward points to an output interface available to the user.

With the above aspects, reward points are calculated in consideration of not only safety but also ecology and service and, therefore, a user is encouraged to treat a leased vehicle with caution, so a decrease in the residual value of the leased vehicle is suppressed. A safe driving score for calculating reward points is calculated based on safe driving points for driving evaluations, and an eco-driving score for calculating reward points is calculated based on eco-driving points for driving evaluations. Therefore, the safe driving score and the eco-driving score are easily calculated.

With the reward point management device, the reward point management method, and the reward point management system of the disclosure, a decrease in the residual value of a leased vehicle is suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

First, a reward point management system 100 including a reward point management server 4 according to the embodiment of the disclosure will be described with reference to FIG. 1.

The reward point management system 100 is applied to a lease service to lease a leased vehicle 1 to a user. The reward point management system 100 is provided to encourage a user to treat the leased vehicle 1 with caution by giving reward points (rewarding points) to the user depending on how the leased vehicle 1 is used.

Figure 1:
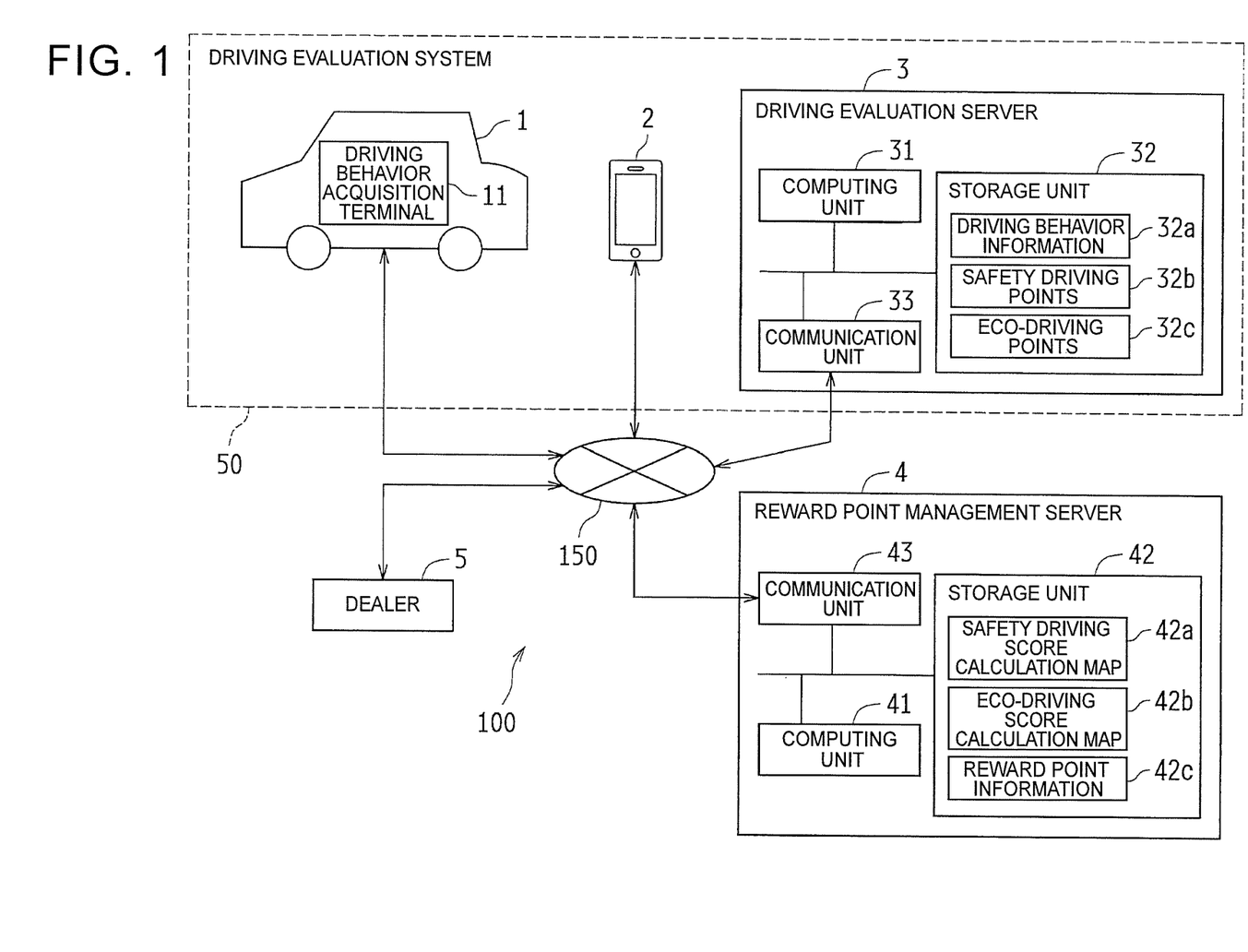
FIG. 1 is a block diagram that shows the schematic configuration of a reward point management system according to an embodiment.

As shown in FIG. 1, the reward point management system 100 includes the leased vehicle 1, an operating terminal 2, a driving evaluation server 3, a reward point management server 4, and a dealer 5 that are connected via a network 150. The user who leases the leased vehicle 1 and the user who carries the operating terminal 2 are one and the same. The leased vehicle 1 and the operating terminal 2 are associated with the user. For the sake of simplification, FIG. 1 shows only the leased vehicle 1 and operating terminal 2 of one user. Actually, the leased vehicles 1 and operating terminals 2 of a plurality of users are connected to the network 150. In other words, the reward point management system 100 is configured to manage reward points of a plurality of users in a predetermined region (for example, a country or a prefecture) on a user-by-user basis. Management of reward points for each user is similar among the users. Therefore, hereinafter, of a plurality of users, management of reward points for a predetermined user will be described.

The reward point management system 100 includes a driving evaluation system 50. The reward point management system 100 is configured to calculate reward points by using the result evaluated by the driving evaluation system 50. The driving evaluation system 50 is configured to perform driving evaluations based on a user's driving behavior in the leased vehicle 1 and inform the user of the evaluated result. Driving evaluations include evaluations on safe driving and evaluations on eco-driving (ecological driving). The driving evaluation system 50 is an existing system and is made up of the leased vehicle 1, the operating terminal 2, and the driving evaluation server 3.

The leased vehicle 1 is equipped with a driving behavior acquisition terminal 11. The driving behavior acquisition terminal 11 is configured to acquire driving behavior information when the user is driving the leased vehicle 1 and send the driving behavior information to the driving evaluation server 3. Driving behavior information contains various pieces of information such as acceleration, braking, vehicle speed, and travel distance.

The operating terminal 2 is, for example, a smartphone. The operating terminal 2 is configured to receive user's operation and display information on the leased vehicle 1 and the user. The operating terminal 2 is an example of a terminal device of the disclosure.

The driving evaluation server 3 is configured to, based on the driving behavior information received from the driving behavior acquisition terminal 11, calculate safe driving points corresponding to a degree of safe driving and eco-driving points corresponding to a degree of eco-driving.

Safe driving points are calculated as follows. Evaluations are performed on three items, that is, acceleration, braking, and speed, and the three items are marked by adding up to points out of 100. For example, safe driving points decrease as the number of times of rapid acceleration (rapid start) increases, safe driving points decrease as the number of times of sudden braking (sudden stop) increases, and safe driving points decrease as the number of times of overspeed increases.

Eco-driving points are calculated as follows. Evaluations are performed on four items, that is, acceleration work, braking work, speed keeping, and idling, and the four items are marked by adding up to points out of 100. For example, eco-driving points increase as the number of times of start with appropriate acceleration work increases, eco-driving points increase as the number of times of stop with appropriate acceleration work and braking work, eco-driving points increase as unnecessary acceleration or deceleration reduces during steady travel, and eco-driving points increase as a stop-start period extends.

The driving evaluation server 3 includes a computing unit 31, a storage unit 32, and a communication unit 33. The computing unit 31 is configured to control the driving evaluation server 3 by executing computations based on various control programs, maps, and the like, stored in the storage unit 32. The storage unit 32 stores various control programs, maps that are consulted when the various control programs are run, and the like. The storage unit 32 stores driving behavior information 32a acquired from the leased vehicle 1, and safe driving points 32b and eco-driving points 32c calculated based on the driving behavior information 32a. The communication unit 33 is connected to the network 150 and is provided to communicate with the leased vehicle 1, the operating terminal 2, and the reward point management server 4. The driving evaluation server 3 is configured to rank the eco-driving points of the plurality of users among the plurality of users in the predetermined region.

In the thus configured driving evaluation system 50, driving behavior information is acquired by the driving behavior acquisition terminal 11 when the user is driving the leased vehicle 1, and the driving behavior information is sent from the driving behavior acquisition terminal 11 to the driving evaluation server 3. In the driving evaluation server 3, the driving behavior information received from the driving behavior acquisition terminal 11 is stored in the storage unit 32. In the driving evaluation server 3, driving evaluations are performed based on the driving behavior information 32a stored in the storage unit 32, and the evaluated result is stored in the storage unit 32. In other words, safe driving points and eco-driving points are calculated based on the driving behavior information 32a, and the safe driving points 32b and the eco-driving points 32c are stored in the storage unit 32. Driving evaluations are performed by using, for example, the driving behavior information 32a in a predetermined period. Subsequently, when the operating terminal 2 is operated by the user, a request to send the evaluated result is sent from the operating terminal 2 to the driving evaluation server 3. When the driving evaluation server 3 receives the sending request, the evaluated result is sent from the driving evaluation server 3 to the operating terminal 2. In the operating terminal 2, the received evaluated result (safe driving points and eco-driving points) is shown. Therefore, the user is allowed to check the safe driving points and the eco-driving points.

The reward point management server 4 is configured to manage reward points to be given to users. The reward points are usable to, for example, pay for a lease fee of the leased vehicle 1. The reward point management server 4 is configured to give more reward points to a user who uses the leased vehicle 1 in a better manner so as to motivate the user to treat the leased vehicle 1 with caution. The reward point management server 4 is configured to calculate a safe driving score, an eco-driving score, and a service score and calculate reward points to be given to a user based on the three scores. The details of calculation of the reward points will be described later. The reward point management server 4 is an example of a reward point management device of the disclosure.

The reward point management server 4 is configured to calculate reward points to be given to a user at intervals of a predetermined period (for example, intervals of one month), set a date (for example, three years) for the expiry of the reward points, and manage the total amount of reward points (reward point balance) of the user. In other words, the reward point management server 4 is configured to, when reward points to be given at intervals of the predetermined period have been calculated, add the calculated reward points to the reward point balance and, when reward points have been used to pay for a lease fee, subtract the used reward points from the reward point balance. The reward point management server 4 is configured to, when the expiry date has come without usage of reward points, subtract the unused reward points (expired reward points) from the reward point balance.

The reward point management server 4 includes a computing unit 41, a storage unit 42, and a communication unit 43. The computing unit 41 is configured to control the reward point management server 4 by executing computations based on various control programs, maps, and the like, stored in the storage unit 42. The storage unit 42 stores various control programs, maps that are consulted when the various control programs are run, and the like. The storage unit 42 stores a safe driving score calculation map 42*a*, an eco-driving score calculation map 42*b*, and reward point information 42*c*.

The reward point information 42*c* contains reward point balances and reward point histories. A reward point history contains reward points given to a user (gained reward points), dates on which the reward points have been gained, reward points used by the user (used reward points), and dates on which the reward points have been used. The communication unit 43 is connected to the network 150 and is provided to communicate with the operating terminal 2, the driving evaluation server 3, and the dealer 5.

When the computing unit 41 runs the programs stored in the storage unit 42, various functions of a processor of the disclosure are implemented.

When the leased vehicle 1 has been entered into service at the dealer 5, the leased vehicle 1 entered into service is supposed to be subjected to inspection, maintenance, and the like. The dealer 5 is configured to store service entry information of the leased vehicle 1. Service entry information contains a date of service entry, the number of times of service entry, and the like. It is assumed that a service entry of the leased vehicle 1 into the dealer 5 is, for example, twice a year.

With the thus configured reward point management system 100, a user is allowed to set payment for a lease fee using reward points by, for example, operating the operating terminal 2. When the operating terminal 2 is operated by the user, a request to inquire reward point information is sent from the operating terminal 2 to the reward point management server 4. When the reward point management server 4 receives the inquiry request, the reward point information is sent from the reward point management server 4 to the operating terminal 2. The received reward point information shows up on the operating terminal 2. Therefore, a user is allowed to check reward point information containing a reward point balance and a reward point history. That is, the reward point information is informed to the user via the operating terminal 2. Furthermore, the reward point information may be informed to the use via an output interface mounted on the leased vehicle 1.

Reward Point Calculation Procedure by Reward Point Management Server

Next, a reward point calculation procedure that is executed by the reward point management server 4 of the present embodiment will be described with reference to FIG. 2 to FIG. 4. This calculation of reward points is executed by the reward point management server 4 at intervals of a predetermined period (for example, intervals of one month).

Figure 2:
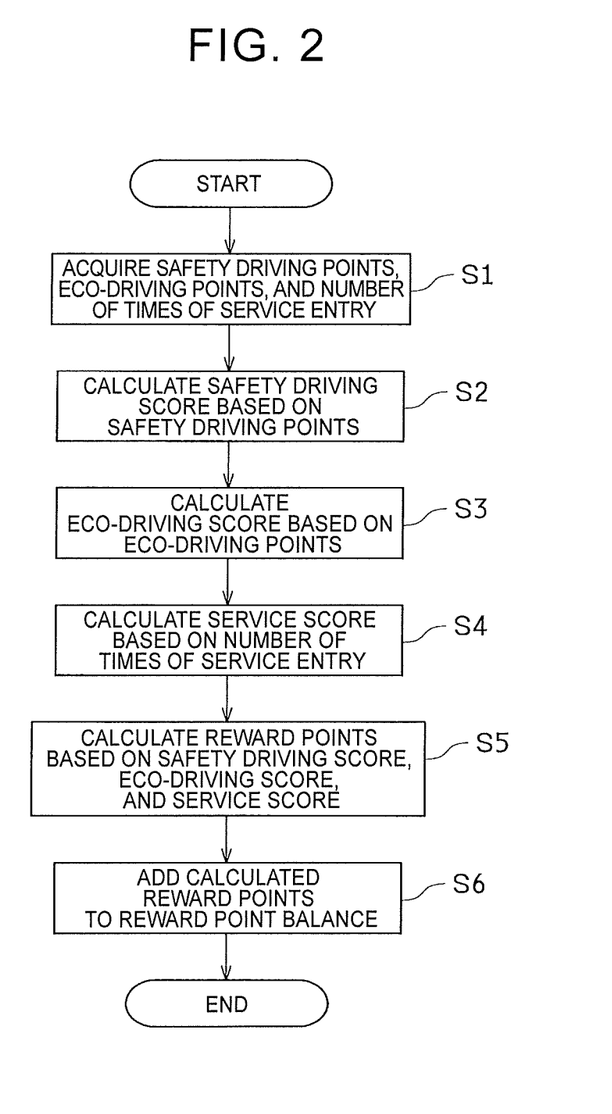
FIG. 2 is a flowchart for illustrating a reward point calculation procedure that is executed by a reward point management server of the embodiment.
Figure 3:
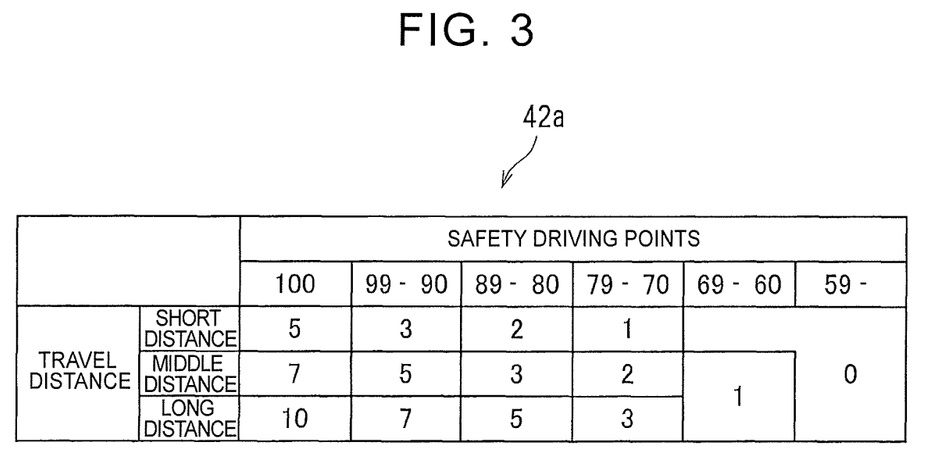
FIG. 3 is a table that shows an example of a safe driving score calculation map stored in the reward point management server of the embodiment.

First, in step S1 of FIG. 2, safe driving points, eco-driving points, and the number of times of service entry are acquired. Safe driving points, eco-driving points, and the number of times of service entry are, for example, safe driving points, eco-driving points, and the number of times of service entry in a predetermined period (for example, one month) before the time of calculation of reward points. Specifically, a request to send an evaluated result (safe driving points and eco-driving points) is sent from the reward point management server 4 to the driving evaluation server 3, and the evaluated result is sent from the driving evaluation server 3 to the reward point management server 4 in response to the sending request. When the reward point management server 4 receives the evaluated result from the driving evaluation server 3, the safe driving points and the eco-driving points are acquired by the reward point management server 4. Together with the eco-driving points, the ranking of the eco-driving points among a plurality of users in a predetermined region (for example, a country or a prefecture) is acquired. A request to send the number of times of service entry is sent from the reward point management server 4 to the dealer 5, and the number of times of service entry is sent from the dealer 5 to the reward point management server 4 in response to the sending request. When the reward point management server 4 receives the number of times of service entry from the dealer 5, the number of times of service entry is acquired by the reward point management server 4. A travel distance of the leased vehicle 1 in the predetermined period before the time of calculation of reward points is also acquired from the driving evaluation server 3 as in the case of the evaluated result.

Subsequently, in step S2, a safe driving score is calculated based on the safe driving points and travel distance acquired in step S1. A safe driving score is, for example, derived by using the safe driving score calculation map 42*a* (see FIG. 3) stored in the storage unit 42. As shown in FIG. 3, the safe driving score calculation map 42a is a two-dimensional map with safe driving points and travel distance as parameters. A safe driving score increases as safe driving points increase, and a safe driving score increases as a travel distance extends. For example, when the safe driving points are 100 and the travel distance is a long distance, the safe driving score is 10. In other words, a safe driving score for calculating reward points is calculated by using safe driving points for driving evaluations.

After that, in step S3, an eco-driving score is calculated based on the eco-driving points acquired in step S1. An eco-driving score is, for example, derived by using the eco-driving score calculation map 42b (see FIG. 4) stored in the storage unit 42.

Figure 4:
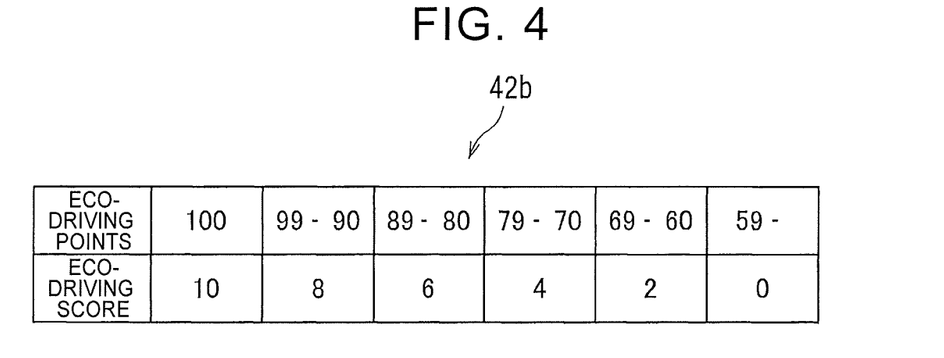
FIG. 4 is a table that shows an example of an eco-driving score calculation map stored in the reward point management server of the embodiment.

As shown in FIG. 4, the eco-driving score calculation map 42b is a one-dimensional map with eco-driving points as a parameter. An eco-driving score increases as eco-driving points increase. For example, when the eco-driving points are 100, the eco-driving score is 10. An eco-driving score is added for higher rankers by eco-driving points among the plurality of users in the predetermined region. For example, 10 is added to an eco-driving score for users whose ranking by eco-driving points falls within the range of the first place to the tenth place, and 5 is added to an eco-driving score for users whose ranking by eco-driving points falls within the range of the eleventh place to the 100th place. No points are added for uses whose ranking by eco-driving points is lower than or equal to the 101st place. In other words, an eco-driving score for calculating reward points is calculated by using eco-driving points for driving evaluations.

Subsequently, in step S4, a service score is calculated based on the number of times of service entry, acquired in step S1. Since service entry of twice a year is assumed, when the reward point calculation procedure is performed 12 times a year, it is assumed that the number of times of service entry is zero in the reward point calculation procedure of 10 times out of 12 times and the number of times of service entry is one in the reward point calculation procedure of twice out of 12 times. For example, when the number of times of service entry is one, the service score is one; when the number of times of service entry is zero, the service score is zero.

After that, in step S5, reward points to be given to the user are calculated based on the safe driving score calculated in step S2, the eco-driving score calculated in step S3, and the service score calculated in step S4. Specifically, a total amount is calculated by adding up the safe driving score, the eco-driving score, and the service score, and reward points are calculated by multiplying the total amount by a preset coefficient.

Subsequently, in step S6, the reward points calculated in step S5 are added to the reward point balance.

In other words, in this reward point calculation procedure, reward points to be given increase as the degree of safe driving increases, reward points to be given increase as the degree of eco-driving increases, and reward points to be given increase when there is a service entry. When the degree of safe driving is high, occurrence of accidents is reduced. When the degree of eco-driving is high, driving is careful, so the deterioration of the leased vehicle 1 is reduced. When the leased vehicle 1 has been entered into service at the dealer 5, the performance of the leased vehicle 1 is maintained. In other words, more reward points are given to users who are considered to use the leased vehicle 1 in a better manner and highly contribute to minimization of a decrease in the residual value of the leased vehicle 1.

Advantageous Effects

In the present embodiment, as described above, reward points to be given to a user are calculated from a safe driving score based on safe driving points, an eco-driving score based on eco-driving points, and a service score based on the number of times of service entry. Therefore, reward points are calculated in consideration of not only safety but also ecology and service, so the user is encouraged to treat the leased vehicle 1 with caution, with the result that a decrease in the residual value of the leased vehicle 1 is minimized. A safe driving score for calculating reward points is calculated based on safe driving points for driving evaluations, and an eco-driving score for calculating reward points is calculated based on eco-driving points for driving evaluations. Therefore, the safe driving score and the eco-driving score are easily calculated.

Other Embodiments

The embodiment described above is illustrative and not restrictive in all respects.

For example, the above embodiment describes the example in which the driving evaluation server 3 and the reward point management server 4 are provided; however, the disclosure is not limited thereto. Alternatively, a single server having the function of the driving evaluation server and the function of the reward point management server may be provided.

The above embodiment describes the example in which the reward point management server 4 is provided; however, the disclosure is not limited thereto. Alternatively, an ECU having the function of the reward point management server may be mounted on a leased vehicle. In this case, the leased vehicle is an example of the reward point management device of the disclosure. The ECU of the leased vehicle may have not only the function of the reward point management server but also the function of the driving evaluation server.

The above embodiment describes the example in which reward points are usable to pay for a lease fee of the leased vehicle 1; however, the disclosure is not limited thereto. Alternatively, reward points may be usable to pay for fees other than a lease fee. For example, reward points may be usable to pay for a vehicle. Alternatively, reward points may be exchangeable with goods or may be exchangeable with reward points of a system other than this system, or electric money.

The above embodiment describes the example in which, when the reward point management server 4 has received an inquiry request, the reward point management server 4 sends reward point information to the operating terminal 2; however, the disclosure is not limited thereto. Alternatively, the reward point management server may be configured to send reward point information to the operating terminal at intervals of a predetermined period, or the reward point management server may be configured to send reward point information to the operating terminal each time the reward point balance is updated.

The above embodiment describes the example in which a safe driving score is calculated by using the safe driving score calculation map 42a and an eco-driving score is calculated by using the eco-driving score calculation map 42b; however, the disclosure is not limited thereto. Alternatively, a safe driving score and an eco-driving score may be calculated by using predetermined computing equations.

Figure 5:
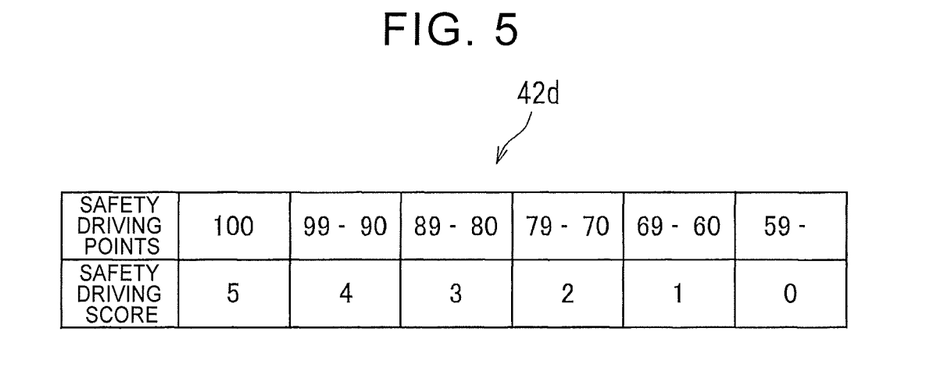
FIG. 5 is a table that shows a safe driving score calculation map according to a modification of the embodiment.

The above embodiment describes the example in which the safe driving score calculation map 42a is a two-dimensional map with safe driving points and travel distance as parameters; however, the disclosure is not limited thereto. Alternatively, as in the case of a modification shown in FIG. 5, a safe driving score calculation map 42d may be a one-dimensional map with safe driving points as a parameter. In this safe driving score calculation map 42d, when safe driving points are 100, a safe driving score is five. In other words, a method of calculating a safe driving score may be changed as needed as long as a calculation method is based on safe driving points.

The above embodiment describes the example in which an eco-driving score is added to higher rankers by eco-driving points; however, the disclosure is not limited thereto. Alternatively, an eco-driving score need not be added to higher rankers by eco-driving points. In other words, a method of calculating an eco-driving score may be changed as needed as long as a calculation method is based on eco-driving points.

The above embodiment describes the example in which a service score is calculated based on the number of times of service entry; however, the disclosure is not limited thereto. Alternatively, a service score may be calculated based on the details of service (for example, inspection items, or the like) provided when a leased vehicle has been entered into service at the dealer. Alternatively, a service score may be added according to introduction of a user, participation in an event, or the like.

The above embodiment describes the example in which the number of times of service entry is sent from the dealer 5 to the reward point management server 4 when reward points are calculated; however, the disclosure is not limited thereto. Alternatively, information on service entry of a leased vehicle may be sent from the dealer to the reward point management server each time the leased vehicle is entered into service at the dealer, and the number of times of service entry may be prestored in the reward point management server when reward points are calculated.

The above embodiment describes the example in which the operating terminal 2 is a smartphone; however, the disclosure is not limited thereto. Alternatively, the operating terminal may be a personal computer or another device, or the function of the operating terminal may be implemented in a leased vehicle.

The above embodiment describes the example in which, when the driving evaluation server 3 has received a request to send an evaluated result, the driving evaluation server 3 sends the evaluated result to the operating terminal 2; however, the disclosure is not limited thereto. Alternatively, the driving evaluation server may be configured to send an evaluated result to the operating terminal at intervals of a predetermined period.

The above embodiment describes the example in which safe driving points are calculated from three items, that is, acceleration, braking, and speed; however, the disclosure is not limited thereto. Alternatively, in addition to the three items, that is, acceleration, braking, and speed, safe driving points may be calculated in consideration of other items such as a steering wheel. In other words, a method of calculating safe driving points may be changed as needed.

The above embodiment describes the example in which eco-driving points are calculated from four items, that is, acceleration work, braking work, speed keeping, and idling; however, the disclosure is not limited thereto. In addition to the four items, that is, acceleration work, braking work, speed keeping, and idling, eco-driving points may be calculated in consideration of other items such as an air-conditioner. In other words, a method of calculating eco-driving points may be changed as needed.

A reward point management device according to a first aspect of the disclosure includes a processor. The one or more processors are configured to calculate a safe driving score based on safe driving points corresponding to a degree of safe driving of the user according to a user's driving behavior in a leased vehicle, the user leasing the leased vehicle; calculate an eco-driving score based on eco-driving points corresponding to a degree of eco-driving of the user according to the user's driving behavior on the leased vehicle; calculate a service score based on service entry information on the leased vehicle; and calculate reward points to be given to the user based on the safe driving score, the eco-driving score, and the service score.

In the above aspect, the reward points may be usable to pay for a lease fee of the leased vehicle, the one or more processors may be configured to add the reward points that are calculated at intervals of a predetermined period and manage a total amount of the reward points given to the user, the processor may be configured to set an expiry date for reward points to be given, the processor may be configured to, when the expiry date has come without usage of the reward points, subtract unused reward points from the total amount, and the processor may be configured to, when the reward points have been used to pay for the lease fee, subtract the used reward points from the total amount.

In the above aspect, the one or more processors may be configured to calculate the safe driving score based on a travel distance of the leased vehicle and the safe driving points.

In the above aspect, the one or more processors may be configured to add points to the eco-driving score of each of a plurality of users who uses the leased vehicle in a predetermined region according to ranking of the eco-driving points of the plurality of users.

In the above aspect, the one or more processors may be configured to output the point to an output interface available to the user.

In the above aspect, the one or more processors may be configured to inform a total amount of the point to a terminal device carried by the user.

In the above aspect, the service score may be associated with a level of contribution of the user to minimization of a decrease in a residual value of the leased vehicle.

In the above aspect, the safe driving points and the eco-driving points may be used for driving evaluations, and the safe driving score and the eco-driving score may be used for calculating the reward points.

A reward point management method according to a second aspect of the disclosure includes: transmitting driving behavior information to a server from a vehicle, the driving behavior information being information on a driving behavior of a user in the vehicle, and the vehicle being leased by the user; calculating, by using one or more processors of the server, safe driving points and eco-driving points based on the driving behavior information, the safe driving points indicating a degree of safe driving of the user, and the eco-driving points indicating a degree of eco-driving of the user; calculate, by using the one or more processors, a safe driving score based on the safe driving points; calculating, by using the one or more processors, an eco-driving score based on the eco-driving points; storing, in one or more memories, service entry information on service entry of the vehicle to a dealer; communicating the service entry information to the server from the one or more memories; calculating, by using the one or more processors, a service score based on the service entry information; calculating, by using the one or more processors, reward points to be given to the user who has driven the vehicle based on the safe driving score, the eco-driving score, and the service score; and outputting the reward points from the server to an output interface available to the user.

A reward point management system according to a third aspect of the disclosure includes: a vehicle leased by a user; one or more first memories storing service entry information on service entry of the vehicle to a dealer; and a server including one or more communication modules configured to communicate with the vehicle and the one or more first memories, one or more processors, and one or more second memories storing instructions that cause the one or more processors to acquire, from the vehicle, driving behavior information on a driving behavior of the user in the vehicle, calculate safe driving points and eco-driving points based on the driving behavior information, the safe driving points indicating a degree of safe driving of the user, and the eco-driving points indicating a degree of eco-driving of the user, calculate a safe driving score based on the safe driving points, calculate an eco-driving score based on the eco-driving points, acquire the service entry information from the one or more first memories, calculate a service score based on the service entry information, calculate reward points to be given to the user who has driven the vehicle based on the safe driving score, the eco-driving score, and the service score, and output the reward points to an output interface available to the user.

What is claimed is:

1. A reward point management device comprising one or more processors configured to:
   receive information of a user's driving behavior in a leased vehicle from a terminal disposed in the leased vehicle and configured to acquire at least acceleration information, braking information, vehicle speed information, and travel distance information from the leased vehicle, the information of the user's driving behavior including at least the acceleration information, the braking information, the vehicle speed information, and the travel distance information;
   calculate a safe driving score based on safe driving points corresponding to a degree of safe driving of the user according to the information of the user's driving behavior, the user leasing the leased vehicle, where:
      the safe driving points decrease as a number of times of a rapid acceleration increases
      the safe driving points decrease as a number of times of a sudden braking increases, and
      the safe driving points decrease as a number of times of an overspeed increases;
   calculate an eco-driving score based on eco-driving points corresponding to a degree of eco-driving of the user according to the information of the user's driving behavior, where:
      the eco-driving points increase as a number of times of a start with an appropriate acceleration work increase,
      the eco-driving points increase as a number of times of a stop with an appropriate acceleration work and braking work increase,
      the eco-driving points increase as a number of an unnecessary acceleration or deceleration reduce during steady travel, and
      the eco-driving points increase as a stop-start period extends;
   add points to the eco-driving score of the user based upon a ranking of the eco-driving points of the user with respect to eco-driving points of a plurality of users;
   calculate a service score based on service entry information on the leased vehicle; and
   calculate reward points to be given to the user based on the safe driving score, the eco-driving score, and the service score.

2. The reward point management device according to claim 1, wherein:
   the reward points are usable to pay for a lease fee of the leased vehicle; and
   the one or more processors are configured to
      add the reward points that are calculated at intervals of a predetermined period and manage a total amount of the reward points given to the user,
      set an expiry date for the reward points to be given,
      when the expiry date has come without usage of the reward points, subtract unused reward points from the total amount, and
      when the reward points have been used to pay for the lease fee, subtract the used reward points from the total amount.

3. The reward point management device according to claim 1, wherein the one or more processors are configured to calculate the safe driving score based on a travel distance of the leased vehicle and the safe driving points.

4. The reward point management device according to claim 1, wherein the one or more processors are configured to add points to the eco-driving score of each of the plurality of users who uses the leased vehicle in a predetermined region according to the ranking.

5. The reward point management device according to claim 1, wherein the one or more processors are configured to output the reward points to an output interface available to the user.

6. The reward point management device according to claim 1, wherein the one or more processors are configured to inform a total amount of the reward points to a terminal device carried by the user.

7. The reward point management device according to claim 1, wherein the service score is associated with a level of contribution of the user to minimization of a decrease in a residual value of the leased vehicle.

8. The reward point management device according to claim 1, wherein
   the safe driving points and the eco-driving points are used for driving evaluations, and
   the safe driving score and the eco-driving score are used for calculating the reward points.

9. A reward point management method comprising:
   transmitting driving behavior information to a server from a terminal disposed in a vehicle and configured to acquire at least acceleration information, braking information, vehicle speed information, and travel distance information from the vehicle, the driving behavior information including at least the acceleration information, the braking information, the vehicle speed information, and the travel distance information, the driving behavior information being information on a driving behavior of a user in the vehicle, and the vehicle being leased by the user;
   calculating, by using one or more processors of the server, safe driving points and eco-driving points based on the driving behavior information, the safe driving points indicating a degree of safe driving of the user, and the eco-driving points indicating a degree of eco-driving of the user, where the safe driving points decrease as a number of times of a rapid acceleration increases, the safe driving points decrease as a number of times of a sudden braking increases, the safe driving points decrease as a number of times of an overspeed increases, the eco-driving points increase as a number of times of a start with an appropriate acceleration work increase, the eco-driving points increase as a number of times of a stop with an appropriate acceleration work and braking work increase, the eco-driving points increase as a number of an unnecessary acceleration or deceleration reduce during steady travel, and the eco-driving points increase as a stop-start period extends;

calculate, by using the one or more processors, a safe driving score based on the safe driving points;

calculating, by using the one or more processors, an eco-driving score based on the eco-driving points;

adding, by using the one or more processors, points to the eco-driving score of the user based upon a ranking of the eco-driving points of the user with respect to eco-driving points of a plurality of users;

storing, in one or more memories, service entry information on service entry of the vehicle to a dealer;

communicating the service entry information to the server from the one or more memories;

calculating, by using the one or more processors, a service score based on the service entry information;

calculating, by using the one or more processors, reward points to be given to the user who has driven the vehicle based on the safe driving score, the eco-driving score, and the service score; and outputting the reward points from the server to an output interface available to the user.

10. A reward point management system comprising:

a vehicle leased by a user, the vehicle including a terminal disposed in the leased vehicle and configured to acquire at least acceleration information, braking information, vehicle speed information, and travel distance information from the leased vehicle as driving behavior information on a driving behavior of the user in the vehicle;

one or more first memories storing service entry information on service entry of the vehicle to a dealer; and a server including
    one or more communication modules configured to communicate with the vehicle and the one or more first memories,
    one or more processors, and
    one or more second memories storing instructions that cause the one or more processors to     acquire, from the vehicle, the driving behavior information on a-the driving behavior of the user in the vehicle,     calculate safe driving points and eco-driving points based on the driving behavior information, the safe driving points indicating a degree of safe driving of the user, and the eco-driving points indicating a degree of eco-driving of the user, where the safe driving points decrease as a number of times of a rapid acceleration increases, the safe driving points decrease as a number of times of a sudden braking increases, the safe driving points decrease as a number of times of an overspeed increases, the eco-driving points increase as a number of times of a start with an appropriate acceleration work increase, the eco-driving points increase as a number of times of a stop with an appropriate acceleration work and braking work increase, the eco-driving points increase as a number of an unnecessary acceleration or deceleration reduce during steady travel, and the eco-driving points increase as a stop-start period extends     calculate a safe driving score based on the safe driving points,     calculate an eco-driving score based on the eco-driving points,     add points to the eco-driving score of the user based upon a ranking of the eco-driving points of the user with respect to eco-driving points of a plurality of users;

acquire the service entry information from the one or more first memories,     calculate a service score based on the service entry information,     calculate reward points to be given to the user who has driven the vehicle based on the safe driving score, the eco-driving score, and the service score, and     output the reward points to an output interface available to the user.

11. The reward point management device according to claim 1, wherein the one or more processors are configured to add the points to the eco-driving score of the user based upon a ranking of the eco-driving points of the user in a predetermined region with respect to the eco-driving points of the plurality of users in the predetermined region.

12. The reward point management device according to claim 3, wherein the one or more processors are configured to calculate the safe driving score such that for a particular number of the safe driving points, the safe driving score increases as the travel distance increase.

* * * * *